(12) United States Patent
Goulahsen et al.

(10) Patent No.: US 9,647,826 B2
(45) Date of Patent: May 9, 2017

(54) METHOD FOR MANAGING COMMUNICATIONS BETWEEN TWO DEVICES MUTUALLY CONNECTED VIA A SERIAL LINK, FOR EXAMPLE A POINT-TO-POINT SERIAL INTERFACE PROTOCOL

(71) Applicant: STMICROELECTRONICS (GRENOBLE 2) SAS, Grenoble (FR)

(72) Inventors: Abdelaziz Goulahsen, Coublevie (FR); Gilles Ries, Saint-Jean de Moirans (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 0 days.

(21) Appl. No.: 14/689,107

(22) Filed: Apr. 17, 2015

(65) Prior Publication Data
US 2015/0312006 A1    Oct. 29, 2015

(30) Foreign Application Priority Data
Apr. 28, 2014    (FR) ..................... 14 53790

(51) Int. Cl.
H03M 13/00    (2006.01)
H04L 7/00    (2006.01)
(Continued)

(52) U.S. Cl.
CPC ........ *H04L 7/0054* (2013.01); *G06F 13/4295* (2013.01); *G09G 5/006* (2013.01);
(Continued)

(58) Field of Classification Search
CPC . H04L 7/0054; H04L 1/1607; G06F 13/4295; G06F 13/4265; G09G 5/006
See application file for complete search history.

(56) References Cited

U.S. PATENT DOCUMENTS 5,974,464 A * 10/1999 Shin .................. G09G 5/006
341/58
2009/0315899 A1    12/2009 Pourbigharaz et al.
(Continued)

FOREIGN PATENT DOCUMENTS

EP    2630743 A1    8/2013

OTHER PUBLICATIONS

MIPI Alliance Ed, "MIPI Alliance Standard for Display Serial Interface V1.0", Internet Citation, Apr. 5, 2006, pp. 1-82, XP002677191.
(Continued)

*Primary Examiner* — Sam Rizk
(74) *Attorney, Agent, or Firm* — Slater Matsil, LLP (57) ABSTRACT

A system may include a first device, a second device, a third device, and a serial link between the second device and the third device. The first device may be configured to deliver to the second device an information stream having a transmission fault tolerance associated with a transmission by the second device to the third device over the serial link. A related method may include, during the transmission over the serial link, phases for synchronization between the second and third devices, and during each synchronization phase, the first device may continue to deliver the information stream to the second device.

24 Claims, 3 Drawing Sheets

(51) Int. Cl.
*G09G 5/00* (2006.01)
*G06F 13/42* (2006.01)
*H04L 1/16* (2006.01)

(52) U.S. Cl.
CPC ..... *G06F 13/4265* (2013.01); *G09G 2370/10* (2013.01); *H04L 1/1607* (2013.01)

(56) References Cited

U.S. PATENT DOCUMENTS

2012/0147976 A1  6/2012  Ries
2013/0195210 A1* 8/2013  Swarbrick ............... H04L 25/02
                                                       375/259

OTHER PUBLICATIONS

Widmer, et al., "A DC-Balanced, Partitioned-Block, 8B/10B Transmission Code", IBM Journal of research and development, vol. 27, No. 5, Sep. 1983, pp. 440-451.

ITU-T Recommendation X.200, Information technology—Open Systems Interconnection—Basic Reference Model: The basic model, <http://www.itu.int/rec/T-REC-X/en>, International Telecommunication Union, Jul. 1994, pp. 1-63.

ITU-T Recommendation X.210, Information technology—Open systems interconnection Basic Reference Model: Conventions for the definition of OSI services,<http://www.itu.int/rec/T-REC-X/en>, International Telecommunication Union, Nov. 1993, pp. 1-29.

JESD8-12A, 1.2 V +/− 0.1 V (Normal Range) and 0.8 V-1.3 V (Wide Range) Power Supply Voltage and Interface Standard for Nonterminated Digital Integrated Circuits, JEDEC Solid State Technology Association, Nov. 2005, pp. 1-12.

MIPI Alliance Specification for M-PHY, version 3.0, MIPI Alliance, Inc., Sep. 30, 2013, pp. 1-208.

MIPI Alliance Specification for Low Latency Interface (LLI), version 1.0-26, MIPI Alliance, Inc., Jan. 2012, pp. 1-137.

MIPI Alliance, MIPI Alliance Manufacturer ID Page, "List of all MIPI Manufacturer IDs", <http://mid.mipi.org/>, Oct. 14, 2010, pp. 1-28.

MIPI Alliance Specification for Low Latency Interface (LLI), version 1.0-26, MIPI Alliance, Inc., Dec. 2013, pp. 1-167.

* cited by examiner

METHOD FOR MANAGING COMMUNICATIONS BETWEEN TWO DEVICES MUTUALLY CONNECTED VIA A SERIAL LINK, FOR EXAMPLE A POINT-TO-POINT SERIAL INTERFACE PROTOCOL

TECHNICAL FIELD

The invention relates to the communication of information between two devices mutually connected via a serial link, in particular a point-to-point serial interface protocol, for example a low-latency MIPI interface (known by those skilled in the art as an MIPI LLI: Mobile Industry Processor Interface, Low Latency Interface) which may for example be used in, but is not limited to, mobile terminals, for example cellular mobile telephones. More particularly, the invention is notably, but not exclusively, applicable to the broadcast of, for example, video data, in real time and continuously, a technique known by those skilled in the art as "streaming".

BACKGROUND

In certain cases, the information stream transiting over the serial link may be an information stream having a tolerance to transmission errors (or "fault tolerant"). In other words, it is accepted that a certain number of bits of information may be lost without this being able to significantly affect the result. This is the case, for example, for a video stream in which the information comprises digital words associated with the various pixels of the images to be displayed for example, and, in this case, it can be acceptable for some pixels to be lost without this being noticeable to the naked eye for the user watching the displayed images.

SUMMARY

According to one embodiment and its implementation, an objective is to improve the efficiency of the transmission link between two devices, or in other words, to notably improve the bandwidth of this link, in the case of information streams having a fault tolerance, as is, for example, the case for the video stream in "streaming" applications.

According to one aspect, a method is provided for managing communications within a system. The system includes a first device, for example a direct memory access (DMA) controller, a second device, for example, including a low-latency interface (LLI) controller and the corresponding physical layer (PHI Layer), and a third device also including, for example, a low-latency interface controller and its associated physical layer. A serial link is between the second device and the third device, for example, a point-to-point serial interface protocol such a low-latency MIPI interface.

The first device is configured to deliver an information stream to the second device. The information stream has a transmission fault tolerance based upon its transmission by the second device to the third device over the link. This information stream can, for example, be a video stream comprising digital words associated with the various pixels of the video stream.

The method according to this aspect includes, during the transmission over the link, phases for synchronization between the second and third devices and, during each synchronization phase, the first device continues to deliver the information stream to the second device. In other words, there is no interruption in the delivery of the information stream between the first device (for example the DMA controller) and the second device (for example the LLI controller and the PHY layer), even during the synchronization phases, and even at the risk of losing some information. The efficiency of the link, notably its bandwidth, is thus improved in particular for real-time and continuous video stream broadcast (or "streaming") applications.

Of course, during these synchronization phases, the transmission of the information stream, for example digital words associated with pixels, is interrupted over the link between the second device and the third device (for example the two LLI controllers and their PHY layer) and synchronization words are transmitted over the link instead of transmitting information from the information stream. Although it may theoretically not be indispensable, in practice it is preferable, notably to analyze the quality of the transmission, that, during the transmission over the link, a detection of the potential presence of a transmission error is carried out by the third device (for example the LLI controller and the PHY layer).

Furthermore, according to one embodiment, in the presence of a transmission error, the third device can apply a wait processing on the received information stream until the expiration of the next phase for synchronization between the second and third devices. This wait processing may take any form, for example, it may include an elimination of received information.

However, when the system additionally includes a fourth device, for example a "display hub", the third device delivers the information received from the second device to the fourth device in the absence of transmission errors, for example to display the received images. Then, in this case, the wait processing can include duplication by the third device of at least one bit of information received prior to the detection of transmission errors and a delivery to the fourth device of the duplicated information. Such a processing is known by those skilled in the art as "stuffing".

Several variants are possible. According to a first variant, the synchronization phases can be periodic and triggered upon the initiative of the second device. The value of the period between two synchronization phases depends on the data rate and on the acceptable number of transmission errors. Others variants are possible when the third device carries out a detection of the potential presence of a transmission error during the transmission of the information streams over the link.

Thus, according to one embodiment, when the third device detects a transmission error, the latter transmits an indication of an error to the second device over the link. The second device then triggers a synchronization phase and eliminates the information received from the first device between the reception of the indication of an error and the end of the synchronization phase.

Furthermore, the information tainted by the transmission error is not re-transmitted to the third device by the second device. In other words, it is accepted that a certain number of bits of information will be lost, in other words those received from the first device (the DMA controller for example) between the reception of the indication of an error and the end of the synchronization phase. Furthermore, the information that has been tainted with a transmission error is not re-transmitted to the third device (the remote LLI controller and its associated physical layer for example). In other words no mechanism known by those skilled in the art as a "retry" is applied here.

The efficiency of the transmission link, in particular its bandwidth and hence the speed of transmission of the data stream, is further improved here. Furthermore, the absence of a "retry" mechanism allows the structure of the transmitted frames to be simplified by notably avoiding the presence of cyclic redundancy check (or CRC) words, which also contributes to an increase in the efficiency.

Furthermore, it is also possible, instead of eliminating the information received from the first device between the reception of the indication of an error and the end of the synchronization phase, to store it in memory in such a manner that it is transmitted to the third device after the synchronization phase. However, here again, no "retry" mechanism will be carried out. In other words the information tainted with a transmission error is not re-transmitted to the third device by the second device.

It is possible to select one of these implementations (periodic synchronization phase, triggering of a synchronization phase in the presence of an indication of an error with elimination of the information and without "retry" mechanism, or storage in memory of the information without "retry" mechanism) depending, for example, on the acceptable number of lost pixels and hence on the desired quality of the image.

According to another aspect, a system is provided, that includes a first device, a second device, a third device and a serial link between the second device and the third device. The first device includes first processing means or a first processor configured to deliver to the second device an information stream having a transmission fault tolerance associated with to its transmission by the second device to the third device over the link. The second device includes second processing means or a second processor configured to generate, during the transmission over the link, synchronization phases between the second and third devices. The first device include control means or a controller configured for, during each synchronization phase, authorizing the first processing means to continue delivering the information stream to the second device.

According to one embodiment, the third device includes third processing means or a third processor configured for, during the transmission over the link, detecting the potential presence of a transmission error. According to one embodiment, the third processing means are furthermore configured for, in the presence of such an error, applying a wait processing to the information stream until the expiration of the next phase for synchronization between the second and third devices.

According to one embodiment, in which the system further includes a fourth device connected to the third device, and the third processing means are also configured for delivering the received information to the fourth device in the absence of a transmission error and for carrying out the wait processing including a duplication by the third device of at least one bit of information received prior to the detection of a transmission error and a delivery to the fourth device of the duplicated information.

According to one variant, the second processing means possess a first state in which they are configured for periodically triggering the synchronization phases. The value of the period between two synchronization phases is based upon the streaming data rate and on an acceptable number of transmission errors.

According to another variant, the second and third processing means have a second state in which the third processing means are furthermore configured for, when a transmission error is detected transmitting over the link an indication of an error to the second processing means, and in which the second processing means are furthermore configured for, in the presence of the indication of an error, triggering a synchronization phase, eliminating the information received from the first device between the reception of the indication of an error and the end of the synchronization phase, and not transmitting to the third device the information having been tainted with the transmission error.

According to yet another variant, the second and third processing means have a third state in which the third processing means are furthermore configured for, when a transmission error is detected transmitting to the second processing means over the link an indication of an error, and in which the second processing means are furthermore configured for, in the presence of the indication of an error, triggering a synchronization phase, storing in a memory means the information received from the first device between the reception of the indication of an error and the end of the synchronization phase, transmitting this stored information to the third device after the synchronization phase and not transmitting to the third device the information having been tainted with the transmission error.

According to one embodiment, the second and third processing means each possess three states, and the second and third devices furthermore include respective management means or circuitry configured for selectively placing the second and third processing means in one of their three states.

According to another aspect, a device is configured to be connected to a serial link and includes input means or an input configured for receiving an information stream having a transmission fault tolerance associated with its transmission over the link. The device includes processing means or a processor configured for generating, during the transmission over the link, phases for synchronization over the link. The input means are configured for continuing to receive the information stream during each synchronization phase.

Such a device may, for example, include a low-latency MIPI interface controller associated with a low-latency interface module (known by those skilled in the art by the acronym M-PHY). Such a device may, for example, be incorporated within an application processor disposed, for example, within a cellular mobile telephone.

According to one embodiment, the processing means have a first state in which they are configured for periodically triggering the synchronization phases. The value of the period between two synchronization phases is based upon the streaming data rate and on an acceptable number of transmission errors.

According to another possible embodiment, the processing means have a second state in which they are configured for, in the presence of an indication of transmission error received from the link, triggering a synchronization phase, eliminating the information received by the input means between the reception of the indication of an error and the end of the synchronization phase, and not transmitting over the link the information having been tainted with the transmission error.

According to yet another possible embodiment, the processing means have a second state in which they are configured for, in the presence of an indication of a transmission error received from the link, triggering a synchronization phase, storing in a memory means the information received by the input means between the reception of the indication of an error and the end of the synchronization phase, transmitting this stored information over the link after the synchronization phase and not transmitting over the link the information having been tainted with the transmission error. According to another possible embodiment, the processing means each possess three states. The device furthermore includes management means or circuitry configured for selectively placing the processing means in one of their three states.

DETAILED DESCRIPTION

The embodiments will now be described in the more particular framework of the low-latency data transfer interfaces such as the MIPI LLI interfaces, although the embodiments are not limited to such applications. The low-latency interface (LLI) is a point-by-point interconnection between two components. Each point or node can implement a data transfer protocol such as the MIPI LLI protocol including multiple layers which may be based on the open system interconnection (OSI) protocol stack.

Such a protocol stack generally comprises at least one physical layer (PHY) and one data link layer (DL) on top of the physical layer. The protocols such as the MIPI LLI and MIPI UNIPRO protocols have an intermediate layer for adapting the physical layer (Physical Adapter: PA Layer). This notably allows multiple physical layers to be supported, such as the MIPI M-PHY or MIPI D-PHY layers, and a corresponding physical adapter layer to be used.

The MIPI LLI protocol uses an MIPI M-PHY layer as physical layer. The protocol stack furthermore includes a Transaction Layer on top of the Data Link Layer.

The Physical Adapter Layer, the Data Link Layer and the Transaction Layer form the upper protocol layers of the protocol stack. The upper protocol layers can be generated by state machines and incorporated within a micro-controller, called an LLI controller.

The physical layer, for example MIPI M-PHY, is formed, for example, within an analogue module. The two physical layers of two distinct components are connected via a serial link that includes one or more transmission channels and one or more reception channels. This serial link supports the point-to-point serial interface protocol such as the low-latency MIPI interface.

Figure 1:
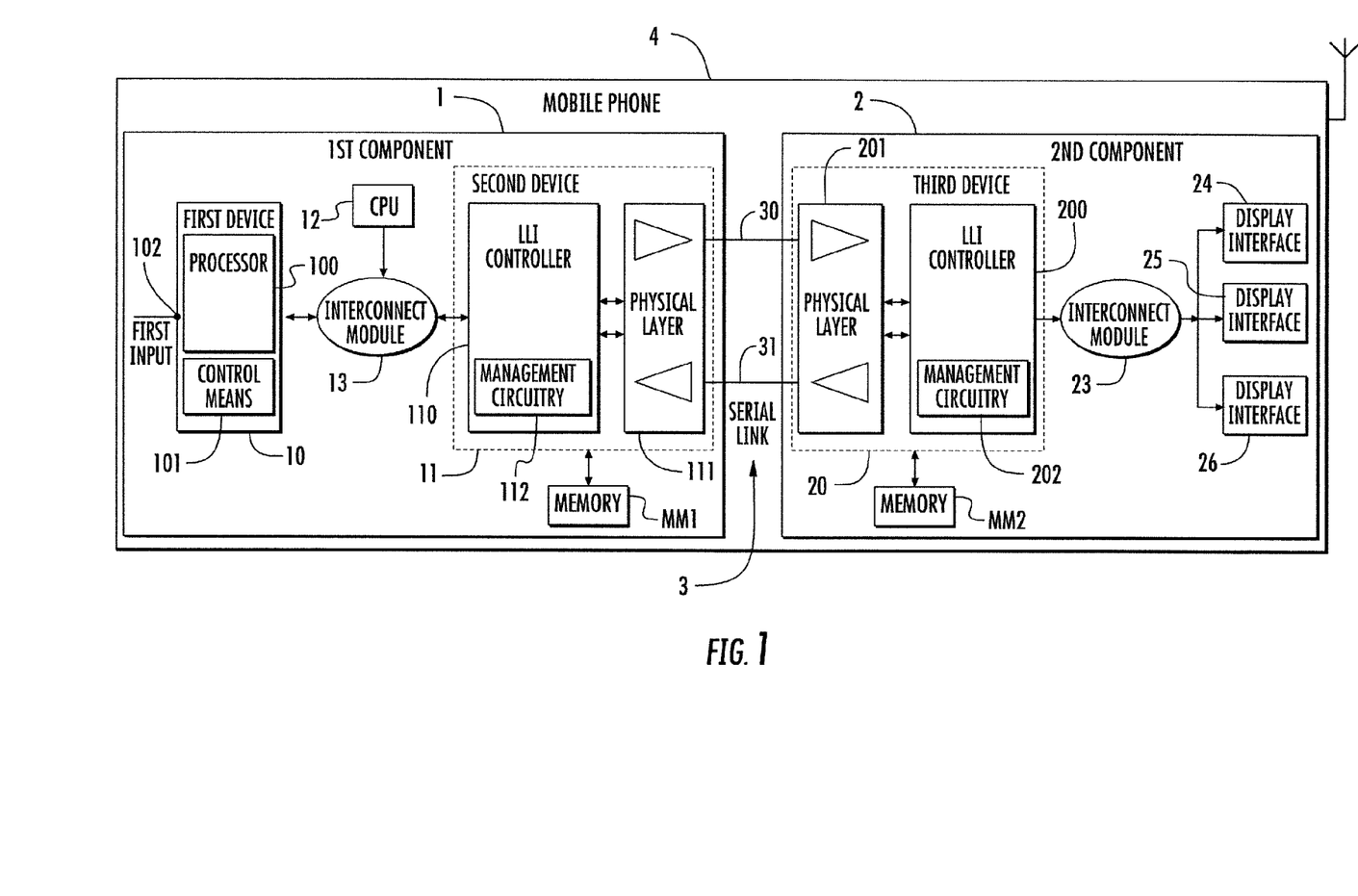
FIG. 1 is a schematic block diagram of an embodiment of a system according to the claimed invention.

In FIG. 1, the system SYS includes a first component 1 and a second component 2 connected via a serial link 3 and incorporated, for example, within a cellular mobile telephone 4. The first component 1 is, for example, an applications processor that includes a first device 10 including, for example, a direct memory access controller. A second device 11 includes an LLI controller 110 and its associated module or physical layer 111. The processor 1 also conventionally includes a central processing unit 12. All of these elements are interconnected via an interconnection module 13.

The first device 10 receives, on its input means 102 or input, an information stream having a transmission fault tolerance. In the application which is described here, this information stream is a video stream that includes digital words associated with pixels of successive images. More precisely, if the red green blue (RGB) format is, for example, used, three digital words of eight bits each are associated with each pixel.

The first device 10 includes processing means 100 or a processor, for example, implemented by software within the direct memory access controller or else by specific logic circuits, configured for delivering this information stream to the second device 11 for its transmission to the second component 2 via the serial link 3. The first device also includes control means 101 or a controller, for example software configured for authorizing or prohibiting the delivery of the information stream to the second device 11.

The second device 11 includes second processing means or a second processor distributed within the controller 110 and the interface module 111 and implemented, for example, in the form of state machines and/or of software modules and/or of logic circuits.

Furthermore, as will be seen in more detail hereinafter, management means (112) or circuitry, for example software, will be able to place the controller 110 in a particular state. Lastly, memory means MM1 or memory are connected to the second device 11.

The second component 2 is, for example, a display hub that includes a third device 20 also including an LLI controller 200 associated with its module or physical layer 201. Here again, management means 202 or circuitry, for example software, will be able to place the controller 200 in a particular state.

Memory means MM2 or memory are connected to the third device 20. The second device 20 is here also connected to several display interfaces 24, 25, 26 by an interconnection module 23. By way of non-limiting example, the display interface 24 can be an HDMI interface, whereas the interface 25 can be a display port, and the interface 26 can be an LCD screen driver. Each of these display interfaces forms a fourth device. The serial link 3 which supports the serial point-to-point low-latency MIPI interface protocol, includes at least one transmission channel 30 between the physical layer 111 and the physical layer 201, and at least one transmission channel 31 between the physical layer 201 and the physical layer 111.

Figure 2:
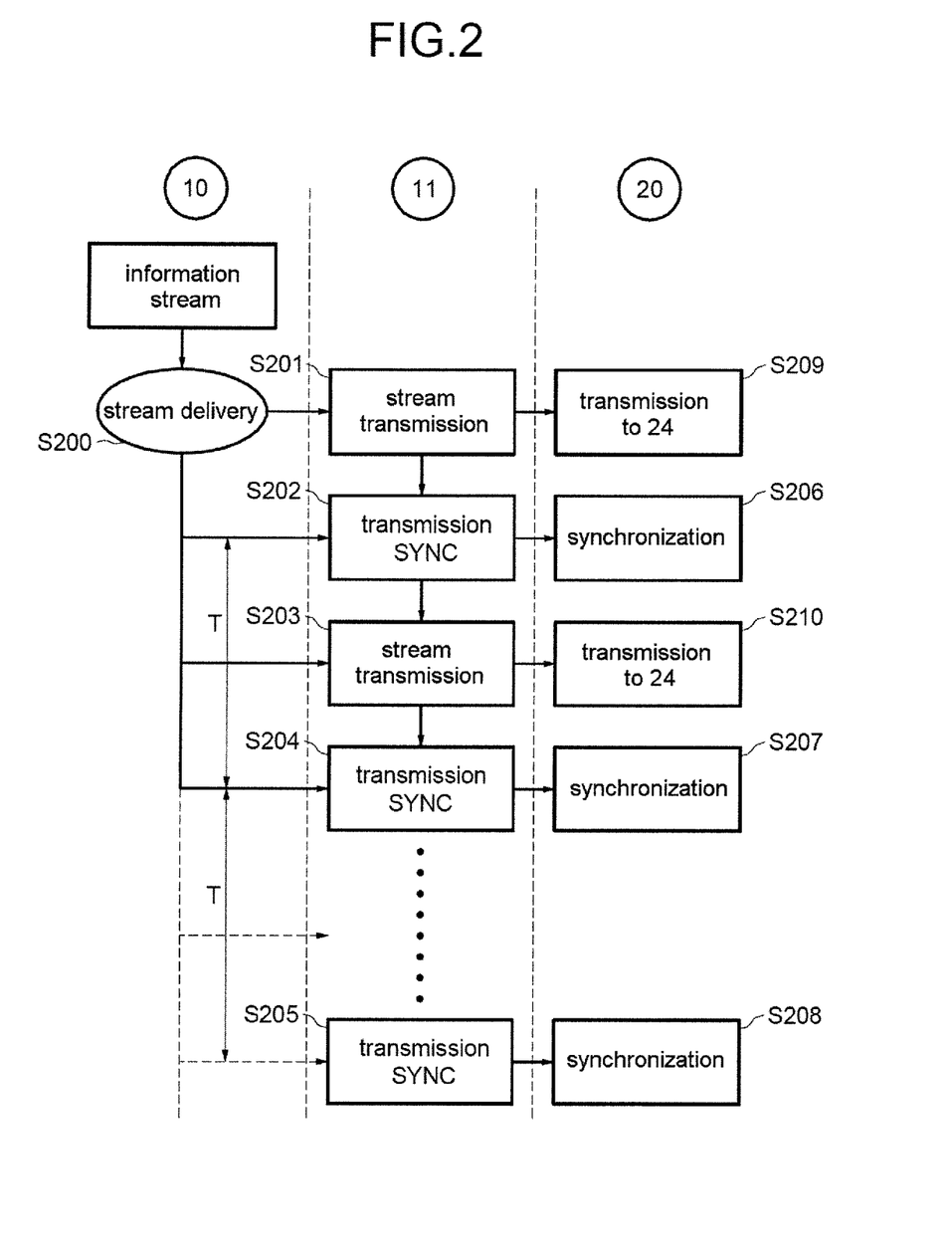
FIG. 2 is a timing diagram of a method according to an embodiment of the claimed invention.

Reference will now more particularly be made to FIG. 2 to describe a first embodiment of a method according to an embodiment. The information stream, composed of triplets of 8-bit words, is delivered (step S200) by the first processing means 100 or first processor from the first device 10 to the second device 11 for its transmission to the third device 20 via the transmission line or lines 30 of the link 3.

For this purpose, conventionally and known per se, each 8-bit word of is coded into a 10-bit symbol by the second processing means of the second device 11 prior to transmission over the transmission line or lines 30. Thus, three 10-bit symbols are associated with each pixel.

This 8-bit/10-bit coding is conventional and known per se. Those skilled in the art will be able, for example, to refer to the article by WIDNER and FRANASZEK entitled "A DC-Balanced, Partioned-Block, 8B/10B transmission Code", IBM Journal of Research and Development, Volume 27, Number 5, September 1983. Thus, to each 8-bit word there corresponds a 10-bit combination, all these combinations being stored in a table of the memory MM1 of the second device 11, as well as in a table of the third device 20.

The third processing means, or processor, of the third device, also distributed between the controller 200 and the associated physical layer 201, decode the 10-bit symbols with the aid of the decoding table and then transmit the 8-bit words associated with the various pixels, for example to the HDMI interface 24 (step S209). In this embodiment, the second processing means 200 and 201 of the second device 20 do not carry out a detection for any potential transmission errors. However, it is possible for some of the transmitted symbols to be tainted with transmission errors. In other words they arrive corrupted at the third device.

However, since the information stream, here the video stream, has a tolerance to transmission errors, in other words losing a few pixels can be accepted as long as this deterioration is not, for example, visible to the naked eye, periodic re-synchronizations between the second and third devices are accordingly carried out. The value of the period T between two synchronization phases is based upon the streaming data rate and on an acceptable number of transmission errors, in other words, in this case, on an acceptable maximum number of lost pixels. Indeed, those skilled in the art know how, as a function notably of the data rate of the transmission line and of the error rate on this line, to calculate statistically the maximum number of pixels that may be lost. Thus, for a transmission line with a data rate of 5.8 Gbits per second, a period of 0.1 microseconds between two synchronization phases leads to a maximum number of lost pixels equal to 19.

The periodic synchronization phases are triggered by the second processing means of the second device and include the transmission of specific synchronization symbols SYNC (steps S202, S204 and S205). These synchronization symbols have a specific content notably allowing a synchronization of the bits onto the clock signal. By way of example, such synchronization symbols, also having 10 bits, include a high transition density, for example at least seven transitions, so as to enable a fast synchronization.

During the synchronization phases S206, S207 and S208, which result from the transmission of these synchronization symbols SYNC, the control means 101 authorizes the first processing means 100 of the first device to continue to deliver the information stream, at the risk of also losing a few pixels. However, this number is fairly low in view of the relatively low number of synchronization symbols, typically less than 5. Then, between two synchronization phases, there is another transmission of the information stream (step S203) followed by a decoding of the symbols and by a transmission of the information to the HDMI interface 24.

Although in the embodiment, which has just been described, while the third processing means of the third device do not carry out any detection of potential errors in transmission, it would be possible for them to do it, for example, to determine the transmission quality. However, even in this case, there would be no transmission of an indication of errors by the third device to the second device and the latter would still periodically trigger the synchronization phases.

Figure 3:
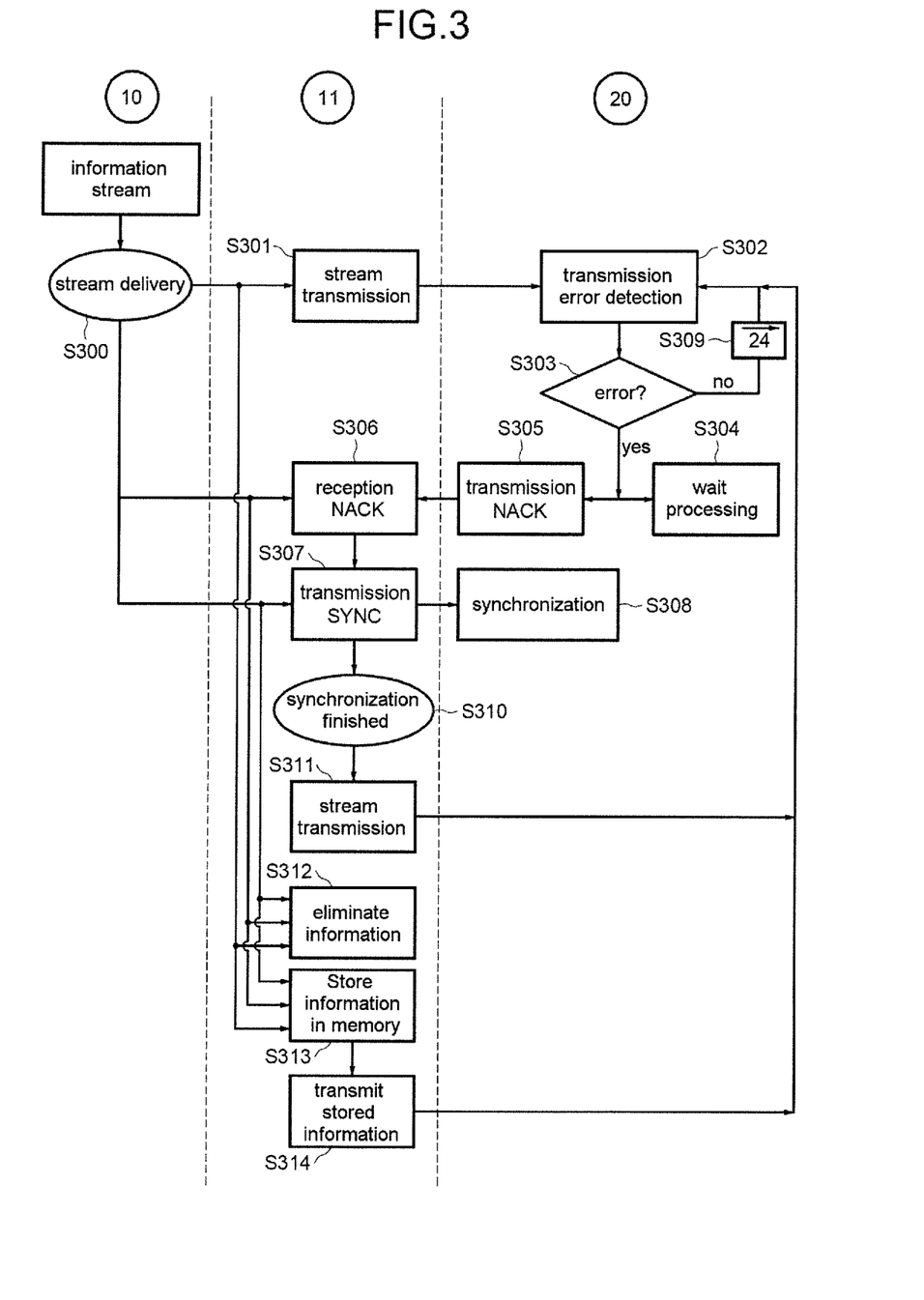
FIG. 3 is a flow diagram of a method according to an embodiment of the claimed invention.

On the other hand, in the embodiments illustrated in FIG. 3, a specific action by the third device 20 is provided when a transmission error is detected. More precisely, as illustrated in FIG. 3, here again, the first processing means 100 of the first device deliver (step S300) the information stream to the second device 11 which, after 8-bit/10-bit coding, transmits the various symbols associated with the various pixels of the image to the third device 20 (step S301).

The third processing means of this third device 20 then carry out a detection of a potential transmission error (step S302). In practice, this detection of errors includes a comparison of each symbol received with the stored content of the table. Accordingly, if the symbol received does not correspond to any symbol stored in this table, it is then considered that there is a transmission error.

If the result of the detection of transmission errors (step S303) is negative, then, as in the preceding embodiment, the received symbols are decoded and transmitted (step S309) to the HDMI interface 24 for example.

If, on the other hand, the result of the step S303 is positive, in other words a transmission error is detected, then there is, on the one hand, transmission by the third processing means of the third device 20 of an indication of errors NACK (step S305) and, on the other hand, establishment of a wait processing (step S304) on the information stream until the expiration of the next phase for synchronization between the second and third devices.

Such a wait processing may include a duplication by the third device of the 8-bit digital words associated with one or more pixels and received prior to the said detection of errors, and a delivery to the HDMI interface 24 of these duplicated digital words. This type of processing is known as "stuffing". As a variant, the wait processing could also include transmitting digital words associated with specific pixels, for example white pixels.

Furthermore, when the second processing means of the second device receive the indication of an error NACK (step S306), they trigger a synchronization phase by transmission (step S307) of the specific synchronization words SYNC. The synchronization S308 then takes place. When this synchronization is finished (step S310), the second processing means of the second device continue with the transmission of the information stream (S311) in an analogous manner to what has previously been described.

In a first variant, the information received between the moment of receiving the indication of an error NACK and the end of the synchronization phase is quite simply eliminated (step S312). Furthermore, aside from this continued delivery of the information stream between the first device 10 and the second device 11, the information which had been tainted with transmission errors is not re-transmitted to the third device at the end of the synchronization phase. In other words, here there is no mechanism known by those skilled in the art as a "retry".

In such an embodiment, there is also a maximum number of lost pixels, which notably depends on the data rate of the transmission line and on the period of time between the transmission of the indication of an error NACK and the end of the synchronization phase. Thus, for a system having a transmission line with a data rate of 2.9 Gbits per second and a period of 200 nanoseconds between the moment of sending the indication of an error NACK and the end of the synchronization, a maximum of 29 pixels may be lost.

According to another variant, it is possible, instead of eliminating the information received between the moment of reception NACK (step S306) and the end of the synchronization (S310), to store it (step S313) in a memory, for example a FIFO type memory, of the memory MM1. This stored information is then transmitted (step S314) after the synchronization phase. In such a variant, assuming a FIFO memory size of 10 pixels, and a single transmission line with a data rate of 2.9 Gbits per second and a period of 200 ns between the moment of transmission of the indication of errors NACK and the end of the synchronization, a maximum of 19 pixels may be lost. Furthermore, here again, in this variant, the transmitted information having been tainted with transmission errors is not re-transmitted, in other words there is still no "retry" mechanism.

It goes without saying that the second and third processing means may be formed in such a manner as to implement the three embodiments which have just been described (periodic synchronization phases, detections of errors, synchronization and elimination of the information, detections of errors, synchronization, storage in memory of the information and transmission of the stored information) and which respectively correspond to three states of these pro- That which is claimed is:

1. A method for managing communications within a system, the method comprising:
 during a transmission, generating a plurality of synchronization phases between a second device and third device coupled to the second device and having a serial link therebetween, the second device being configured to receive an information stream from a first device coupled to the second device, the information stream having a transmission fault tolerance associated with a transmission of the information stream by the second device to the third device over the serial link, each of the plurality of synchronization phases being periodic and triggered based upon the second device, and a value of a period between two of the plurality of synchronization phases being based upon data rates and a number of transmission errors; and
 during each of the plurality of synchronization phases, causing the first device to continue to deliver the information stream to the second device.

2. The method according to claim 1, further comprising, during the transmission over the serial link, using the third device to detect a transmission error.

3. The method according to claim 2, further comprising, when a transmission error is detected, using the third device to delay the information stream until an expiration of a next phase of the plurality of synchronization phases for synchronization between the second and third devices.

4. The method according to claim 3, wherein the system further comprises a fourth device coupled to the third device, wherein the third device is configured to deliver to the fourth device information received from the second device in absence of a transmission error; and wherein delaying the information stream comprises using the third device to duplicate at least one bit of information received prior to the detection of a transmission error and to deliver the duplicated at least one bit of information to the fourth device.

5. The method according to claim 2, further comprising, when the third device detects a transmission error:
 using the third device to transmit an indication of the transmission error to the second device over the serial link; and
 using the second device to trigger a synchronization phase and eliminate information received from the first device between reception of the indication of the transmission error and an end of the synchronization phase, information associated with the transmission error not being retransmitted to the third device.

6. The method according to claim 2, further comprising, when the third device detects a transmission error:
 using the third device to transmit an indication of an error to the second device over the serial link; and
 using the second device to
  trigger a synchronization phase,
  store in a memory information received from the first device between reception of the indication of the error and an end of the synchronization phase, and
  transmit the stored information to the third device after the synchronization phase,
  the information associated with the transmission error not being re-transmitted to the third device.

7. The method according to claim 1, wherein the serial link comprises a point-to-point serial interface.

8. The method according to claim 1, wherein the serial link comprises an MIPI interface.

9. The method according to claim 1, wherein the information stream comprises a video stream.

10. A system comprising:
 a first device;
 a second device coupled to said first device;
 a third device; and
 a serial link coupled between said second device and said third device;
 said first device comprising a first processor configured to deliver to said second device an information stream having a transmission fault tolerance associated with a transmission of the information stream by said second device to said third device over the said serial link;
 said second device comprising a second processor configured to
  generate, during the transmission of the information stream over said serial link, a plurality of synchronization phases for synchronization between said second and third devices, and
  in a first state, periodically trigger the plurality of synchronization phases, a value of a period between two of the plurality of synchronization phases being based upon a streaming data rate and a number of transmission errors;
 said first device further comprising control circuitry configured to, during each of the plurality of synchronization phases, permit said first processor to continue to deliver the information stream to said second device.

11. The system according to claim 10, wherein said third device comprises a third processor configured to, during the transmission over said serial link, detect a transmission error.

12. The system according to claim 11, wherein said third processor is configured to, when a transmission error has been detected, delay the information stream until an expiration of a next phase of the plurality of synchronization phases for synchronization between said second and third devices.

13. The system according to claim 12, further comprising a fourth device coupled to said third device; said third processor also being configured to deliver information received from said second device to said fourth device in an absence of a transmission error and to apply the delay by duplicating at least one bit of the information received prior to the detection of a transmission error and delivery to said fourth device of the duplicated information.

14. The system according to claim 11, wherein said second and third processors each have a second state; wherein in the third state, said third processor is configured to, when a transmission error is detected, transmit over said serial link, an indication of an error to said second processor; and wherein in the third state, said second processor is further configured to, based upon the indication of an error, trigger a synchronization phase, eliminate information received from said first device between reception of the indication of the error and an end of the synchronization phase, and withhold from transmitting to said third device the information associated the transmission error.

15. The system according to claim 11, further comprising a memory coupled to said first device wherein said second and third processors have a third state; wherein in the third state, said third processor is further configured to, when a transmission error is detected, transmit over said serial link an indication of an error to said second processor; and wherein said second processor is further configured to, based upon the indication of an error, trigger a synchronization phase of the plurality of synchronization phases, store in said memory information received from said first device between reception of the indication of an error and an end of the synchronization phase, transmit the stored information to said third device, and withhold from transmitting to said third device information associated with the transmission error.

16. The system according to claim 15, wherein said second and third processors each have three states; and wherein said second and third devices further comprise respective management circuitry configured to selectively place said second and third processors in a given one of the three states.

17. The system according to claim 10, wherein said serial link comprises a point-to-point serial interface protocol.

18. The system according to claim 10, wherein said serial link comprises a low-latency MIPI interface.

19. The system according to claim 10, wherein the information stream comprises a video stream.

20. A device to be connected to a serial link, the device comprising:
an input configured to receive an information stream having a transmission fault tolerance associated with a transmission of the information stream over the serial link; and
a processor configured to
generate, during the transmission over the serial link, a plurality of synchronization phases over the serial link, and
in a first state, periodically trigger the plurality of synchronization phases, a value of a period between two of the plurality of synchronization phases being based upon on a data rate of the information stream and a number of transmission errors;
said input being further configured to continue to receive the information stream during each of the plurality of synchronization phases.

21. The device according to claim 20, wherein said processor, in a second state, is configured to, based upon a transmission error received from the serial link, trigger a synchronization phase, eliminate information received by said input between reception of the indication of an error and an end of the synchronization phase, and withhold transmitting, over the serial link, information associated with the transmission error.

22. The device according to claim 20, further comprising a memory coupled to said processor; wherein said processor, in a second state, is configured to, based upon an indication of a transmission error received from the serial link, trigger a synchronization phase, store in said memory information received by said input between reception of the indication of an error and an end of the synchronization phase, transmit the stored information over the serial link after the synchronization phase, and withhold transmitting over the serial link the information associated with the transmission error.

23. The device according to claim 22, wherein said processor has three states; wherein said device further comprises management circuitry configured to selectively place said processor in one of the three states.

24. The device according to claim 20, further comprising a low-latency MIPI interface controller and an associated physical layer.

* * * * *